US 9,896,795 B2

(12) United States Patent
Bae (10) Patent No.: US 9,896,795 B2
(45) Date of Patent: Feb. 20, 2018

(54) METHOD OF CONTROLLING DRUM TYPE WASHING MACHINE

(71) Applicant: LG ELECTRONICS INC., Seoul (KR)

(72) Inventor: Suncheol Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 177 days.

(21) Appl. No.: 15/013,482

(22) Filed: Feb. 2, 2016

(65) Prior Publication Data

US 2016/0222574 A1    Aug. 4, 2016

(30) Foreign Application Priority Data

Feb. 2, 2015    (KR) .................. 10-2015-0016104

(51) Int. Cl.
| G01M 1/38 | (2006.01) |
| G05B 13/00 | (2006.01) |
| D06F 35/00 | (2006.01) |
| D06F 39/00 | (2006.01) |
| D06F 33/02 | (2006.01) |
| G05B 15/02 | (2006.01) |

(52) U.S. Cl.
CPC ............ D06F 39/003 (2013.01); D06F 33/02 (2013.01); G05B 15/02 (2013.01); *D06F 35/007* (2013.01); *D06F 2202/10* (2013.01); *D06F 2204/06* (2013.01)

(58) Field of Classification Search
CPC ............ D06F 2202/10; D06F 39/003; D06F 2204/065; D06F 2204/06; D06F 35/005; D06F 35/007

USPC .................................................. 700/275, 305
See application file for complete search history.

(56) References Cited

U.S. PATENT DOCUMENTS

| 2005/0016227 A1 | 1/2005 | Lee | |
| 2005/0108830 A1* | 5/2005 | Park | D06F 35/007 8/158 |
| 2015/0233037 A1* | 8/2015 | Kim | D06F 37/225 8/137 |

FOREIGN PATENT DOCUMENTS

| CN | 1884664 A | 12/2006 |
| DE | 10056570 C1 | 3/2002 |
| EP | 2415919 A1 | 2/2012 |
| KR | 10-2002-0073064 A | 9/2002 |
| KR | 10-2004-0046082 A | 6/2004 |
| KR | 10-0471350 B1 | 3/2005 |
| KR | 10-2007-0075487 A | 7/2007 |
| KR | 10-2009-0076334 | 7/2009 |

(Continued)

*Primary Examiner* — Michael J Brown
(74) *Attorney, Agent, or Firm* — Dentons US LLP (57) ABSTRACT

A method of controlling a drum type washing machine is disclosed. The method includes sensing laundry weight to perform a washing cycle (a laundry weight sensing step), immediately executing a first spin-drying pattern without additional laundry weight sensing when a laundry weight value sensed at the laundry weight sensing step is equal to or less than A in a spin-drying cycle, and executing a second spin-drying pattern after sensing the laundry weight when the laundry weight value sensed at the laundry weight sensing step is greater than A in the spin-drying cycle. In a case in which the laundry weight is low, spin-drying is immediately performed without performing laundry weight sensing, whereby it is possible to reduce time necessary to sense the laundry weight.

15 Claims, 9 Drawing Sheets

(56) References Cited

FOREIGN PATENT DOCUMENTS

WO      2006052106 A1    5/2006
WO      2011025313 A1    3/2011

* cited by examiner

METHOD OF CONTROLLING DRUM TYPE WASHING MACHINE

CROSS-REFERENCE TO RELATED APPLICATION

This application claims the priority benefit of Korean Patent Application No. 10-2015-0016104, filed on Feb. 2, 2015 in the Korean Intellectual Property Office, the disclosure of which is incorporated herein by reference.

BACKGROUND OF THE INVENTION

1. Field of the Invention

The present invention relates to a method of controlling a drum type washing machine, and more particularly to a method of controlling a drum type washing machine that is capable of operating in different patterns based on laundry weight, thereby reducing spin-drying time.

2. Description of the Related Art

In general, a washing machine is an apparatus that performs a washing process, a rinsing process, a spin-drying process, etc. to remove contaminants from clothing, bedding, etc. (hereinafter, referred to as 'laundry') using water, a detergent, and a mechanical action.

A washing machine is mainly classified as an agitator type washing machine, a pulsator type washing machine, or a drum type washing machine.

In the agitator type washing machine, a washing rod vertically disposed at the center of a washing tub is rotated in alternating directions to wash laundry. In the pulsator type washing machine, a circular rotary blade formed at the bottom of a washing tub is rotated in alternating directions to wash laundry using frictional force between a stream of water and the laundry. In the drum type washing machine, a drum is rotated in a state in which water, a detergent, and laundry is received in the drum to wash the laundry.

In the drum type washing machine, a tub for receiving wash water is mounted in a cabinet forming the external appearance of the drum type washing machine, a drum for receiving laundry is disposed inside the tub, a motor for rotating the drum is mounted at the rear of the tub, and a drive shaft is coupled to the motor such that the drive shaft is connected to the rear of the drum through the tub. A plurality of lifters is mounted at the inside of the drum to lift the laundry during rotation of the drum.

When the rate capacity of the drum type washing machine is increased, the length of a spring for absorbing vibration generated from the drum type washing machine must be increased. Since the size of the cabinet is limited, however, it is limited to increase the length of the spring based on the rate capacity of the drum type washing machine.

SUMMARY OF THE INVENTION

Therefore, the present invention has been made in view of the above problems, and it is an object of the present invention to provide a method of controlling a drum type washing machine that is capable of operating in different patterns based on laundry weight, thereby reducing spin-drying time.

The objects of the present invention are not limited to the above-mentioned objects and other objects that have not been mentioned above will become evident to those skilled in the art from the following description.

In accordance with the present invention, the above and other objects can be accomplished by the provision of a method of controlling a drum type washing machine including sensing laundry weight to perform a washing cycle (a laundry weight sensing step), immediately executing a first spin-drying pattern without additional laundry weight sensing when a laundry weight value sensed at the laundry weight sensing step is equal to or less than A in a spin-drying cycle, and executing a second spin-drying pattern after sensing the laundry weight when the laundry weight value sensed at the laundry weight sensing step is greater than A in the spin-drying cycle.

The first spin-drying pattern may include accelerating a drum in a stopped state to spin-dry the laundry, and a deceleration period for decelerating the drum may be excluded from the first spin-drying pattern.

The first spin-drying pattern may include a 1-1 stage for accelerating a drum in a stopped state and sensing the unbalance of the laundry in the drum, a 1-2 stage for further accelerating the drum after the 1-1 stage and sensing again the unbalance of the laundry in the drum, and a 1-3 stage for further accelerating the drum after the 1-2 stage to spin-dry the laundry.

The 1-1 stage may include accelerating the drum to a first target speed (a first acceleration step), maintaining the first target speed for a first time after the first acceleration step (a first maintenance step), accelerating the drum to a second target speed after the first maintenance step (a second acceleration step), and maintaining the second target speed for a second time after the second acceleration step (a second maintenance step).

The unbalance of the laundry in the drum may be sensed at at least one selected from between the first maintenance step and the second maintenance step.

When the unbalance of the laundry in the drum sensed at the at least one selected from between the first maintenance step and the second maintenance step is greater than a reference value, the drum may be stopped, and then the first spin-drying pattern may be restarted.

When the number of times of restarting is equal to or greater than B, switching from the first spin-drying pattern to the second spin-drying pattern may be performed.

The 1-2 stage may include accelerating the drum to a third target speed after the 1-1 stage (a third acceleration step) and maintaining the third target speed for a third time after the third acceleration step (a third maintenance step).

The unbalance of the laundry in the drum may be sensed at the third maintenance step, and, when the sensed unbalance of the laundry in the drum is greater than a reference value, the drum may be stopped, and then the first spin-drying pattern may be restarted.

The laundry weight sensing step may include acquiring at least one selected from between a laundry weight value for dry laundry and a laundry weight value for wet laundry.

The first spin-drying pattern may include accelerating a drum to a first target speed (a first acceleration step), maintaining the first target speed for a first time after the first acceleration step (a first maintenance step), accelerating the drum to a second target speed after the first maintenance step (a second acceleration step), maintaining the second target speed for a second time after the second acceleration step (a second maintenance step), accelerating the drum to a third target speed after the second maintenance step (a third acceleration step), maintaining the third target speed for a third time after the third acceleration step (a third maintenance step), and accelerating the drum to a target spin-drying speed after the third maintenance step (a target spin-drying step).

The unbalance of the laundry in the drum may be sensed at at least one selected from among the first maintenance step, the second maintenance step, and the third maintenance step, and, when the unbalance of the laundry in the drum sensed at the at least one selected from among the first maintenance step, the second maintenance step, and the third maintenance step, is greater than a reference value, the drum may be stopped, and then the first spin-drying pattern may be restarted.

The details of other embodiments are included in the following description and the accompanying drawings.

BRIEF DESCRIPTION OF THE DRAWINGS

The embodiments will be described in detail with reference to the following drawings in which like reference numerals refer to like elements wherein.

DETAILED DESCRIPTION OF THE PREFERRED EMBODIMENTS

The advantages and features of the present invention and the way of achieving them will become apparent with reference to embodiments described below in conjunction with the accompanying drawings. However, the present invention is not limited to embodiments disclosed in the following description but may be embodied in various different forms. The embodiments, which will be described below, of the present invention are provided to complete the disclosure of the present invention and to correctly inform those skilled in the art to which the present invention pertains of the scope of the invention. The present invention is defined only by the scope of the accompanying claims. Throughout the specification, the same components are denoted by the same reference numerals.

Hereinafter, embodiments of the present invention will be described in detail with reference to the accompanying drawings illustrating a washing machine and a method of controlling the same.

Figure 1:
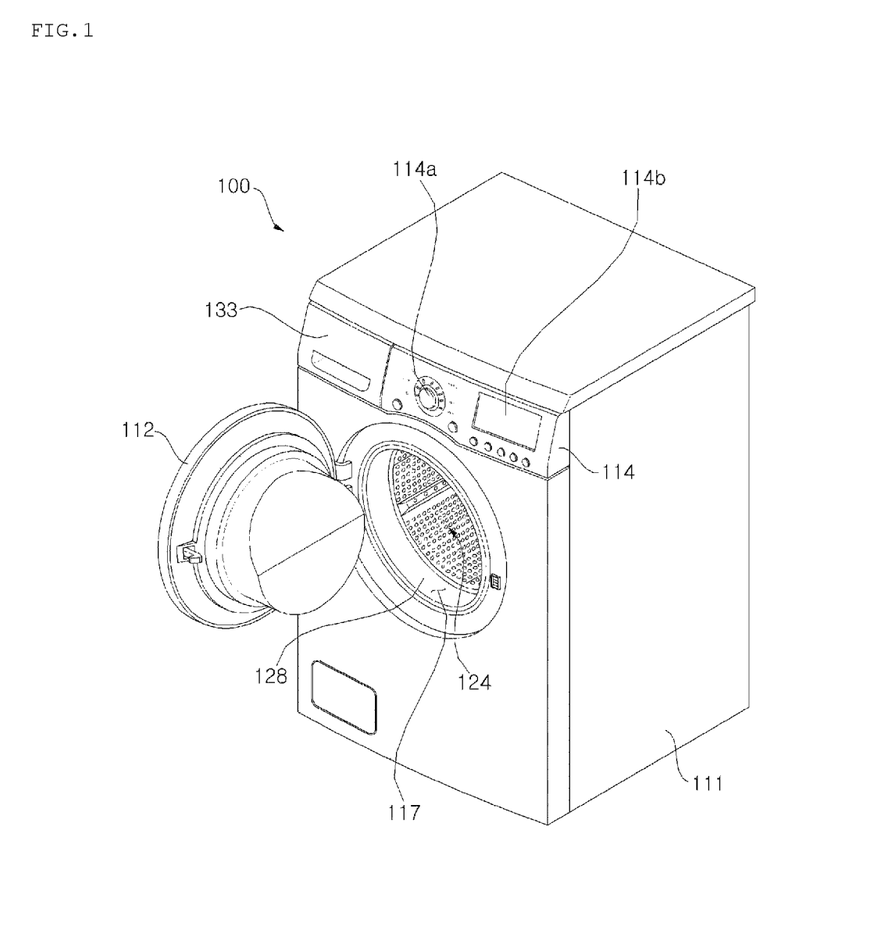
FIG. 1 is a perspective view showing a washing machine according to an embodiment of the present invention.
Figure 2:
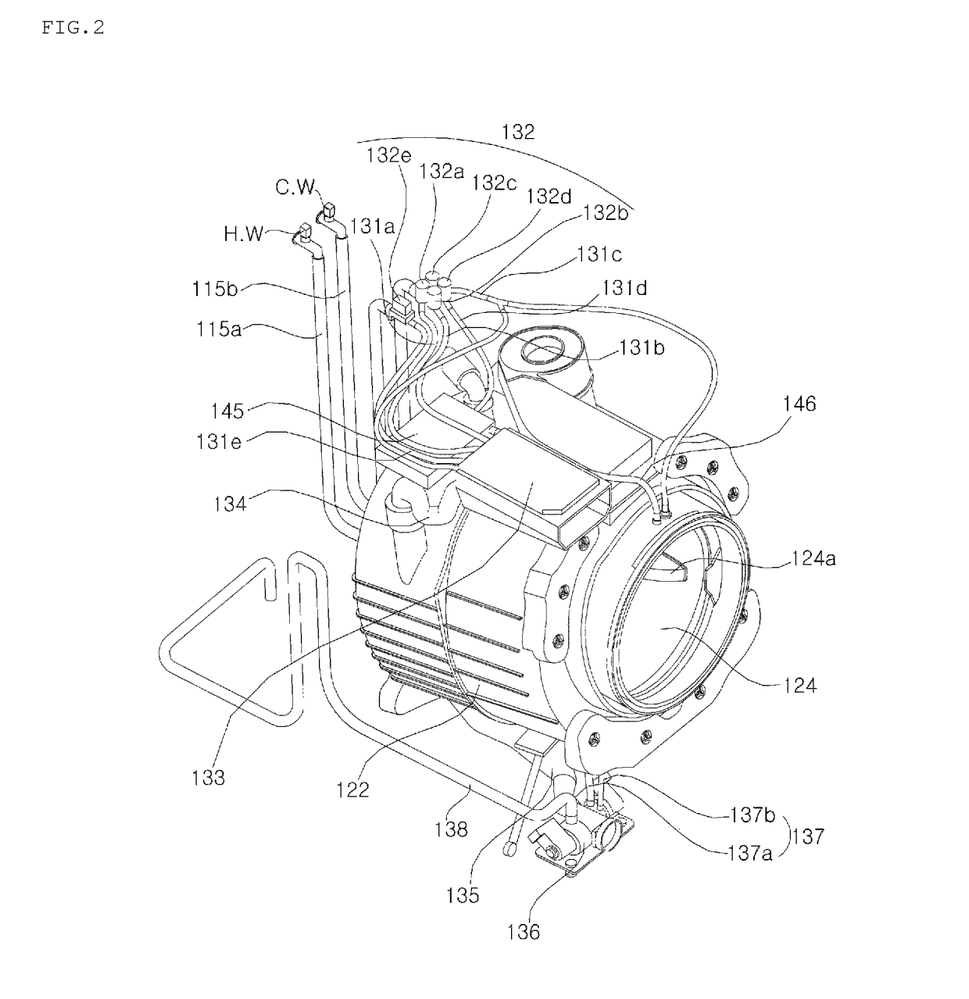
FIG. 2 is a perspective view showing the interior structure of the washing machine shown in FIG. 1.
Figure 3:
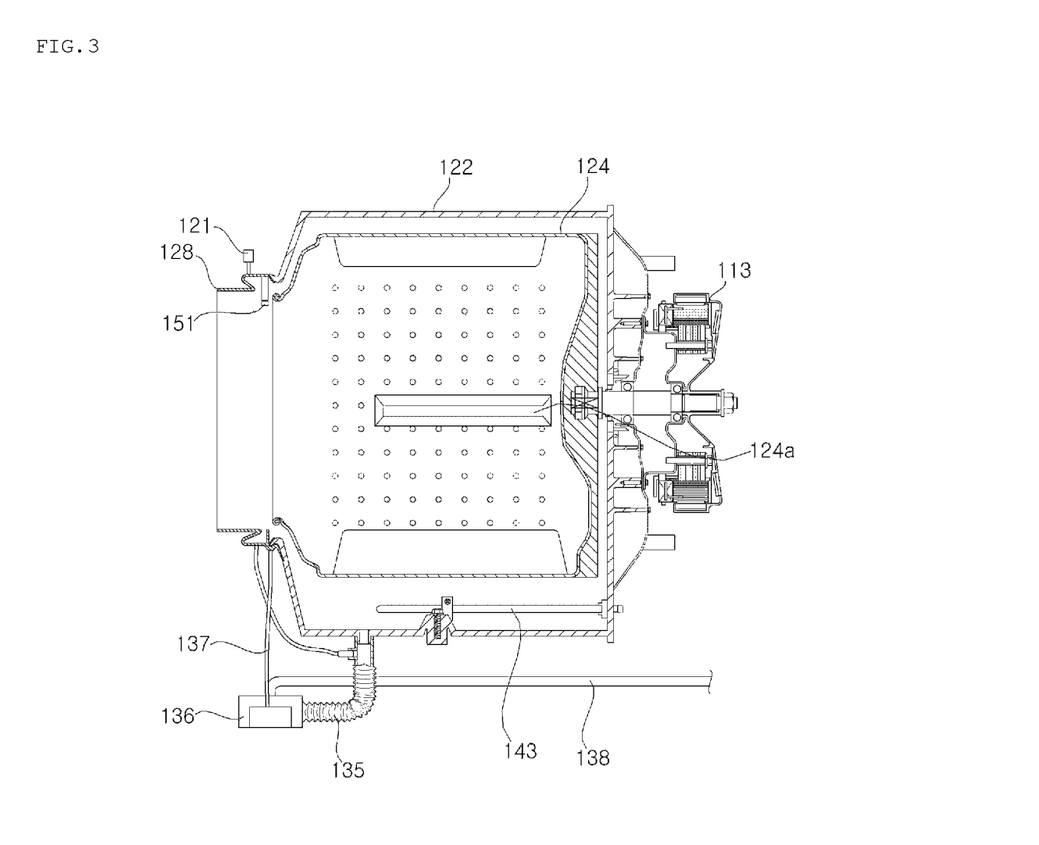
FIG. 3 is a partially sectional view of the washing machine shown in FIG. 1.
Figure 4:
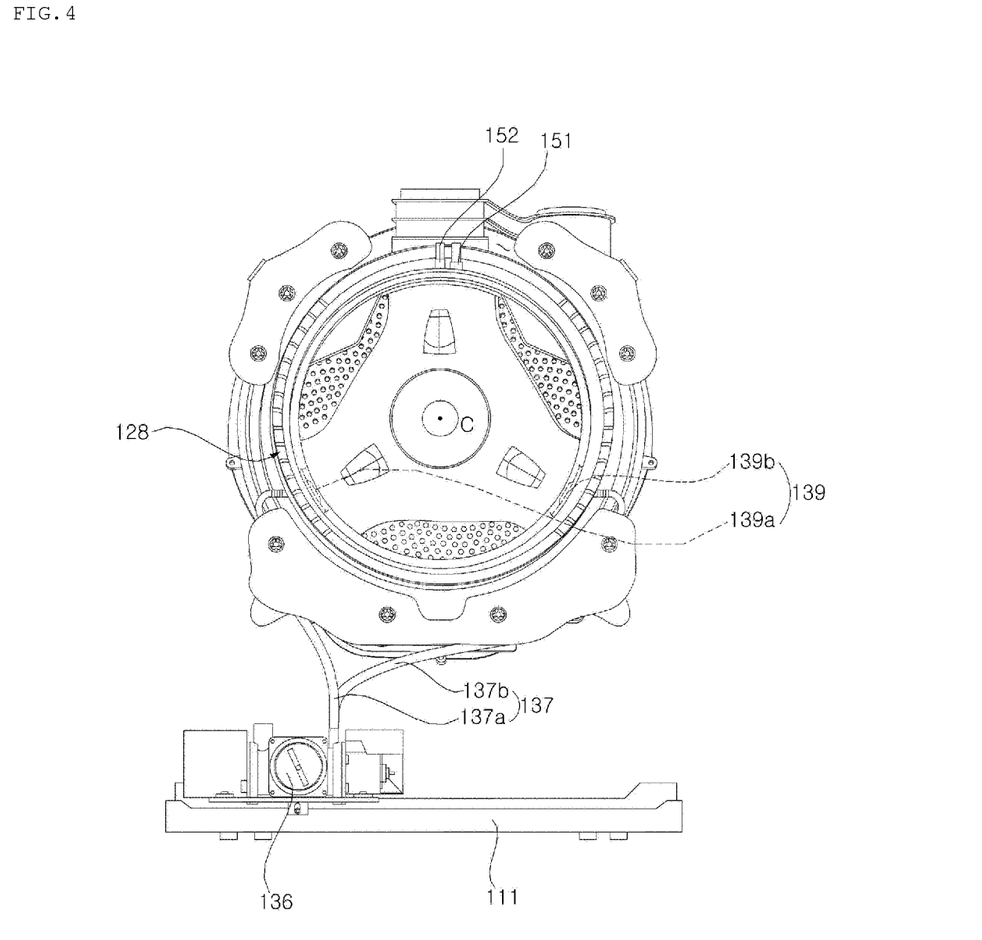
FIG. 4 is a front view showing the interior structure of the washing machine shown in FIG. 1.

FIG. 1 is a perspective view showing a washing machine according to an embodiment of the present invention, FIG. 2 is a perspective view showing the interior structure of the washing machine shown in FIG. 1, FIG. 3 is a partially sectional view of the washing machine shown in FIG. 1, and FIG. 4 is a front view showing the interior structure of the washing machine shown in FIG. 1.

A washing machine 100 according to this embodiment includes a cabinet 111 that forms the external appearance of the washing machine 100, a tub 122 disposed in the cabinet 111 for receiving wash water, a drum 124 rotatably disposed in the tub 122, a driving unit 113 for rotating the drum 124, and a water supply unit 132 for receiving wash water from an external water source and supplying the received wash water to the tub 122.

The washing machine 100 according to this embodiment further includes a detergent box 133 mounted in the cabinet 111 for receiving a washing detergent and mixing wash water supplied from the water supply unit 132 with the washing detergent, a spray nozzle 151 for spraying the wash water supplied from the water supply unit 132 into the drum 124, a pump 136 for discharging the wash water from the tub 122 and supplying the wash water into the tub 122 to circulate the wash water, and a circulation nozzle 139 for spraying the wash water circulated by the pump 136 into the drum 124.

The cabinet 111 forms the external appearance of the washing machine 100. The tub 122 is disposed in the cabinet 111. The cabinet 111 is provided with a laundry introduction hole 117, through which laundry is introduced into the drum 124 and removed from the drum 124. At the front of the cabinet 111 is rotatably mounted a door 112 for opening and closing the laundry introduction hole 117. The cabinet 111 is provided with a control panel 114 for allowing a user to input a command and displaying various kinds of information about the washing machine 100. The detergent box 133, in which a detergent, such as a washing detergent, a rinsing detergent, or a decolorant, is received, is disposed in the cabinet 111 such that the detergent box 133 can be withdrawn from the cabinet 111.

The tub 122 is suspended in the cabinet 111 using a spring unit (not shown) and a damper (not shown), which are disposed in the cabinet 111. The tub 122 receives wash water. The drum 124 is disposed in the tub 122. A portion of the drum 124 may be submerged in the wash water received in the tub 122.

The tub 122 may be provided with a water level sensor 121 for sensing the level of the wash water received in the tub 122. The water level sensor 121 may be variously configured. In this embodiment, a water level sensor 121 for changing the distance between electrodes using air pressure that varies based on the level of the wash water and measuring the level of the wash water based on capacitance variation of the electrodes. In the tub 122 may be provided a heater 143 for heating the wash water.

The drum 124, in which laundry is received, is configured to be rotatable. The drum 124 is provided with a plurality of through holes 124b, through which the wash water flows. At the inner wall of the drum 124 may be mounted a plurality of lifters 124a for lifting the laundry to a predetermined height during the rotation of the drum 124. The drum 124 is rotated using rotational force received from the driving unit 113.

The drum 124 is not disposed in a completely horizontal state. The drum 124 may be disposed in a state of being inclined at a predetermined angle such that the rear part of the drum 124 is lower than the front part of the drum 124.

A gasket 128 is provided between the tub 122 and the cabinet 111 to seal between the tub 122 and the cabinet 111. The gasket 128 is disposed between the inlet of the tub 122 and the laundry introduction hole 117. The gasket 128 eliminates impact applied to the door 112 during the rotation of the drum 124 and, at the same time, prevents the wash water received in the tub 122 from leaking outwards.

The gasket 128 may be made of a single material. Alternatively, in order to increase the intensity in fastening between the gasket 128 and the tub 122 and to improve the rigidity of the gasket 128, a part of the gasket 128 that is fastened to the tub 122 may be made of a hard material. In addition, a part of the gasket 128 that is fastened to the cabinet 111 may be made of an elastic material in order to eliminate vibration transferred from the tub 122 to the cabinet 111.

The gasket 128 is provided with a spray nozzle 151 for introducing wash water into the drum and a steam nozzle 152 for spraying steam into the circulation nozzle 139 and the drum 124.

The driving unit 113 rotates the drum 124. The driving unit 113 may rotated the drum 124 at various rotational speeds or in various rotational directions. The driving unit 113 may include a motor, a switching element for controlling the motor, and a clutch. The driving unit 113 may further include a sensor for measuring the actual rotational speed of the drum 124.

A detergent, such as a washing detergent, a rinsing detergent, or a decolorant, is received in the detergent box 133. The detergent box 133 may be disposed in the front of the cabinet 111 such that the detergent box 133 can be withdrawn from the cabinet 111. When wash water is supplied, the detergent received in the detergent box 133 is mixed with the wash water, and the mixture is introduced into the tub 122. The detergent box 133 may be partitioned into a washing detergent receiving part, a rinsing detergent receiving part, and a decolorant receiving part.

The washing machine 100 is connected to a hot water source H.W, which is connected to an external water source to supply hot water to the washing machine 100, via a hot water hose 115*a*. In addition, the washing machine 100 is connected to a cold water source C.W, which is connected to the external water source to supply cold water to the washing machine 100, via a cold water hose 115*b*. Water introduced through the hot water hose 115*a* and the cold water hose 115*b* is supplied to the detergent box 133, a steam unit 145, and/or a spray nozzle 151 under appropriate control of the water supply unit 132.

In the cabinet 111 are provided the water supply unit 132, which is connected to the hot water hose 115*a* and the cold water hose 115*b* to control the introduction of wash water from the external water source, a first water supply hose 131*a* and a second water supply hose 131*b* connected to the water supply unit 132 for guiding wash water supplied from the cold water source C.W to the detergent box 133 according to the operation of the water supply unit 132, and a third water supply hose 131*c* connected to the water supply unit 132 for guiding wash water supplied from the cold water source C.W to the spray nozzle 151 and the detergent box 133 according to the operation of the water supply unit 132. The third water supply hose 131*c* diverges from the water supply unit 132, and is connected to the spray nozzle 151 and to the detergent box 133.

In addition, in the cabinet 111 are provided a fourth water supply hose 131*d* connected to the water supply unit 132 for guiding wash water supplied from the cold water source C.W to the steam unit 145 according to the operation of the water supply unit 132 and a fifth water supply hose 131*e* connected to the water supply unit 132 for guiding high-temperature wash water supplied from the hot water source H.W to the detergent box 133 according to the operation of the water supply unit 132.

In the cabinet 111 may be provided a water supply pipe 134, through which wash water mixed with the detergent in the detergent box 133, i.e. detergent-contained wash water, is introduced into the tub 122.

The water supply unit 132 includes a preliminary valve 132*a* connected to the first water supply hose 131*a*, a main valve 132*b* connected to the second water supply hose 131*b*, a bleach valve 132*c* connected to the third water supply hose 131*c*, a steam valve 132*d* connected to the fourth water supply hose 131*d*, and a hot water valve 132*e* connected to the fifth water supply hose 131*e* for controlling the introduction of high-temperature wash water.

When the preliminary valve 132*a* is opened, wash water is supplied to the detergent box 133 through the first water supply hose 131*a*. The wash water supplied at the result of opening of the preliminary valve 132*a* passes through the detergent receiving part of the detergent box 133. At this time, the wash water is mixed with a detergent for preliminary washing. Subsequently, the mixture is supplied into the tub 122 through the water supply pipe 134. In a case in which no detergent for preliminary washing is provided, the wash water supplied at the result of opening of the preliminary valve 132*a* is supplied into the tub 122 through the water supply pipe 134 in a state in which no detergent for preliminary washing is mixed with the wash water.

When the main valve 132*b* is opened, wash water is supplied to the detergent box 133 through the second water supply hose 131*b*. The wash water supplied at the result of opening of the main valve 132*b* passes through the detergent receiving part of the detergent box 133. At this time, the wash water is mixed with the detergent received in the detergent receiving part of the detergent box 133. Subsequently, the mixture is supplied into the tub 122 through the water supply pipe 134.

When the main valve 132*b* is opened, wash water is supplied to the detergent box 133 through the second water supply hose 131*b*. The wash water supplied at the result of opening of the main valve 132*b* passes through the detergent receiving part of the detergent box 133. At this time, the wash water is mixed with the washing detergent. Subsequently, the mixture is supplied into the tub 122 through the water supply pipe 134.

When the bleach valve 132*c* is opened, wash water is supplied to the spray nozzle 151 and the detergent box 133 through the third water supply hose 131*c*. A portion of the wash water supplied at the result of opening of the bleach valve 132*c* is sprayed into the drum 124 through the spray nozzle 151. Another portion of the wash water supplied at the result of opening of the bleach valve 132*c* is mixed with the decolorant in the detergent box 133, and the mixture is supplied into the tub 122 through the water supply pipe 134. In a case in which no decolorant is provided, the wash water supplied at the result of opening of the bleach valve 132*c* is supplied into the tub 122 through the water supply pipe 134 in a state in which no decolorant is mixed with the wash water.

When the steam valve 132*d* is opened, wash water is supplied to the steam unit 145 through the fourth water supply hose 131*d*. The wash water supplied at the result of opening of the steam valve 132*d* is heated into steam by the steam unit 145. The steam generated by the steam unit 145 is supplied to the steam nozzle 152 through a steam hose 146, and is sprayed into the drum 124 through the steam nozzle 152.

When the hot water valve 132*e* is opened, high-temperature wash water is supplied to the detergent box 133 through the fifth water supply hose 131*e*. The wash water supplied at the result of opening of the hot water valve 132e passes through the detergent box 133, and is supplied into the tub 122 through the water supply pipe 134.

In the cabinet 111 are provided a drainage pipe 135, through which the wash water is discharged from the tub 122, the pump 136, which discharges the wash water from the tub, a circulation hose 137 connected to the circulation nozzle 139 such that the wash water is circulated and is sprayed into the drum 124, and a drainage hose 138, through which the wash water is drained from the washing machine 100.

The pump 136 is configured to discharge the wash water from the tub 122.

The wash water that has moved to the pump 136 through the drainage pipe 135 is drained from the washing machine 100 through the drainage hose 138, or is supplied into the tub 122 through the circulation hose 137. According to embodiments, the pump 136 may include a circulation pump and a drainage pump, which may be connected to the circulation hose 137 and the drainage hose 138, respectively.

The circulation hose 137 connects the pump 136 with the circulation nozzle 139. The wash water discharged from the tub 122 as the result of operation of the pump 136 pass through the circulation hose 137, and is then sprayed into the drum 124 through the circulation nozzle 139.

The control panel 114 may be provided with an input unit 114b for allowing a user to select washing courses or to input various kinds of operation commands, such as operation time for each cycle and scheduled operations, and a display unit 114a for displaying an operation state of the washing machine 100.

The washing courses may include a lingerie/wool course, a boiling course, a speed washing course, a functional clothing course, laundry damage prevention course, a silent course, and an energy saving course in addition to a normal course, which are classified based on the kind or function of laundry. The operation of the washing machine 100 is classified into a washing cycle, a rinsing cycle, and a spin-drying cycle. In each cycle, a water supply step, a washing step, a rinsing step, a drainage step, a spin-drying step, or a drying step may be performed.

The spray nozzle 151 is provided in the gasket 128 to spray wash water into the drum 124. The spray nozzle 151 is disposed adjacent to the steam nozzle 152. The spray nozzle 151 is connected to the third water supply hose 131c to spray wash water supplied from the external water source into the drum 124.

The spray nozzle 151 may be provided in the upper part of the gasket 128. According to embodiments, the spray nozzle 151 may be disposed at various positions. For example, the spray nozzle 151 may be disposed in the lower part of the gasket 128, between the gasket 128 and the cabinet 111, in the cabinet 111, or in the tub 122.

The spray nozzle 151 may be an atomizing nozzle, which atomizes wash water and sprays the atomized wash water to the side surface and the rear surface of the drum 124.

The steam nozzle 152 is provided in the gasket 128 to spray steam into the drum 124. The steam nozzle 152 is connected to the steam hose 146 to spray steam generated by the steam unit 145 into the drum 124.

The steam nozzle 152 may be disposed in the upper part of the gasket 128. The steam nozzle 152 may be disposed adjacent to the spray nozzle 151. According to embodiments, the steam nozzle 152 may be disposed at various positions. For example, the steam nozzle 152 may be disposed in the lower part of the gasket 128, between the gasket 128 and the cabinet 111, in the cabinet 111, or in the tub 122.

The circulation nozzle 139 is provided in the gasket 128. The wash water circulated as the result of operation of the pump 136 is sprayed into the drum 124 through the circulation nozzle 139. The circulation hose 137 connects the circulation nozzle 139 and the pump 136. The water pumped out as the result of operation of the pump 136 passes through the circulation hose 137, and is then sprayed through the circulation nozzle 139. The circulation nozzle 139 may be formed integrally with the gasket 128.

The circulation nozzle 139 may be provided lower than a rotary shaft of the drum 124 such that wash water can be sprayed upward. A plurality of circulation nozzles 139 may be provided. In this embodiment, two circulation nozzles are provided in the gasket 128.

A first circulation nozzle 139a is provided in the lower left part of the gasket 128 to spray wash water in a rightward and upward direction toward the interior of the drum 124.

A second circulation nozzle 139b is provided in the lower right part of the gasket 128 to spray wash water in a leftward and upward direction toward the interior of the drum 124.

In a case in which a plurality of circulation nozzles 139 is provided, a plurality of circulation hoses 137 is also provided. A first circulation hose 137a may be connected to the first circulation nozzle 139a, and a second circulation hose 137b may be connected to the second circulation nozzle 139b.

The wash water received in the drum 124 moves to the pump 136 along the drainage pipe 135, which is provided in the tub 122. The wash water pumped out as the result of operation of the pump 136 flows to the circulation nozzle 139 through the circulation hose 137. Subsequently, the wash water is sprayed into the drum 124 through the circulation nozzle 139.

In order to spray the wash water into the drum, the circulation nozzles 139 may be disposed in the vicinity of the laundry introduction hole 117.

Figure 5:
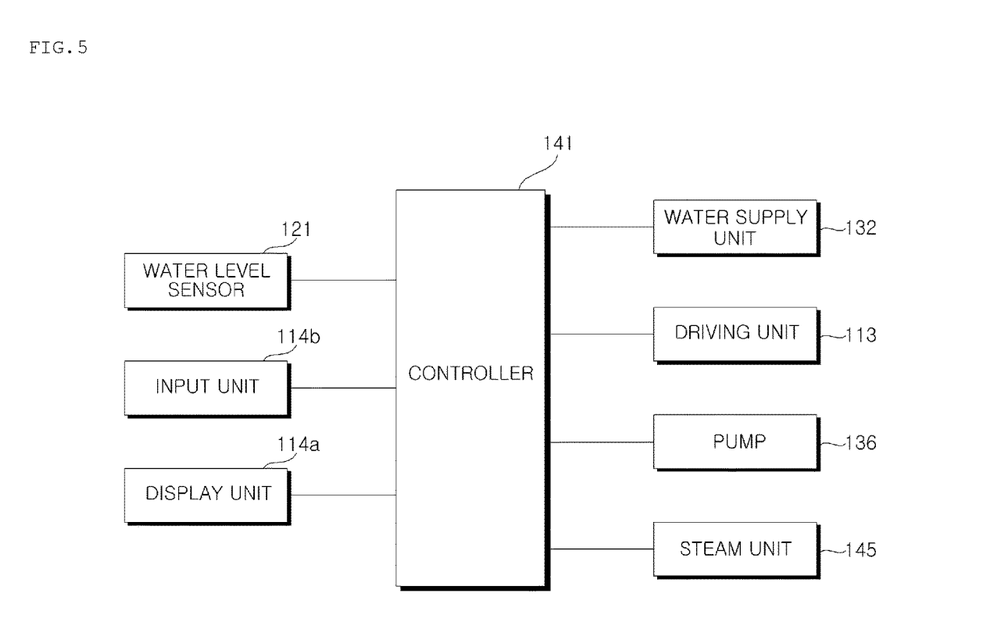
FIG. 5 is a block diagram showing the washing machine according to the embodiment of the present invention.

FIG. 5 is a block diagram showing the washing machine according to the embodiment of the present invention.

A controller 141 controls overall operations of the washing machine according to an operation command input through the input unit 114b. The controller 141 may be provided in the control panel 114. The controller 141 may include a microprocessor for controlling the operation of the washing machine, a storage unit, and other electronic parts. The controller 141 determines whether to perform each cycle, determines whether to perform water supply, washing, rinsing, drainage, spin-drying, and drying in each cycle, and determines operation time and the number of repetitions, based on a washing course selected by the user, and controls the operation of the washing machine accordingly.

The controller 141 receives the level of wash water measured by the water level sensor 121, and reflects the received level of the wash water in washing. The controller 141 receives the rotational speed of the drum 124 measured by the driving unit 113, and processes the received rotational speed of the drum 124. The controller 141 receives the operation command from the input unit 114b, and displays the operation state of the washing machine 100 on the display unit 114a. The controller 141 controls the water supply unit 132, the driving unit 113, the pump 136, and the steam unit 145 according to the selected course.

Figure 6:
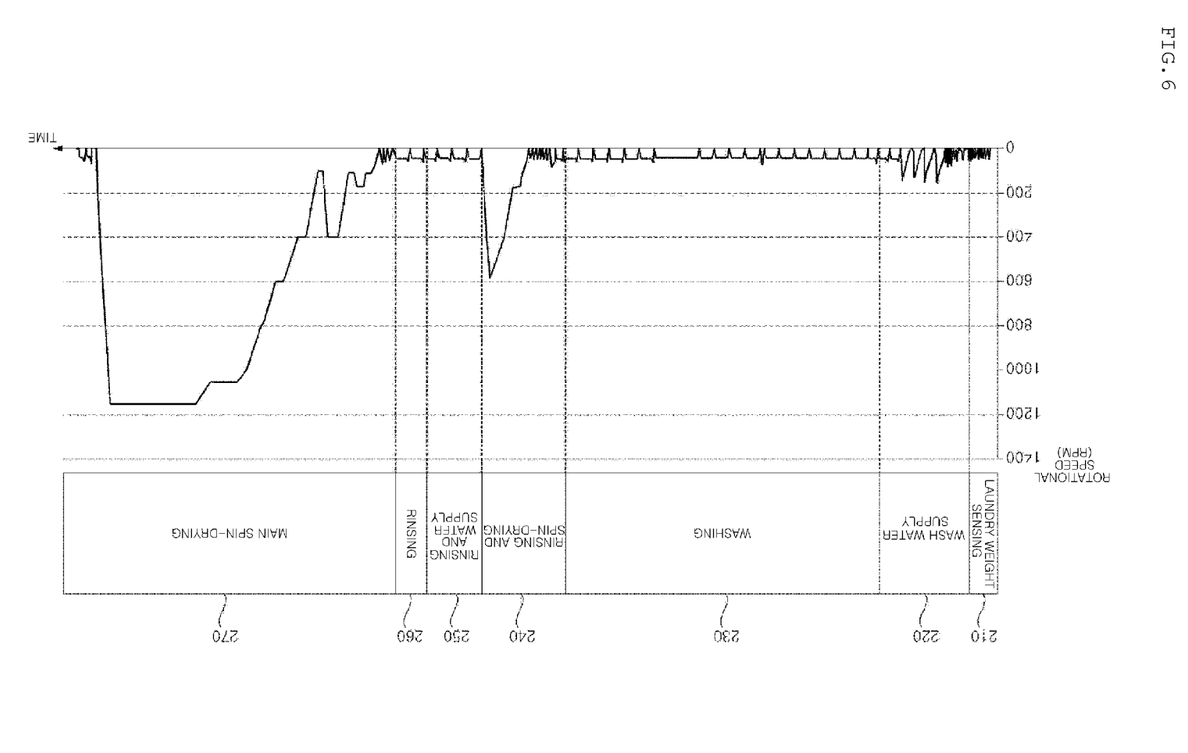
FIG. 6 is a graph showing the rotational speed of a drum in a method of controlling a washing machine according to an embodiment of the present invention.

FIG. 6 is a graph showing the rotational speed of a drum in a method of controlling a washing machine according to an embodiment of the present invention.

Laundry weight sensing (210) is a step of operating the driving unit 113 to sense the weight of laundry (hereinafter, referred to as laundry weight) received in the drum 124 and setting a target water level based on the sensed laundry weight.

In laundry weight sensing (210), the laundry weight may be measured using various methods. In this embodiment, the driving unit 113 rotates the drum 124 at a predetermined rotational speed for a predetermined time, and then the controller 141 measures a speed reduction time to measure the laundry weight. The controller classifies the sensed laundry weight using the term 'level'. High level means high laundry weight. The longer the speed reduction time of the drum 124 is, the higher the level of the laundry weight.

Unlike this embodiment, the controller 141 may measure an acceleration time of the drum 124 to calculate the laundry weight.

The controller 141 sets a target water level based on the sensed laundry weight.

The target water level is a target amount of wash water that is to be supplied into the tub 122 after the completion of wash water supply (220). The controller 141 controls the water supply unit 132 to supply wash water into the tub 122 until the water level sensed by the water level sensor 121 becomes the target water level. In addition, the controller 141 sets an operation time for each cycle based on the sensed laundry weight.

For example, each cycle may be one selected from among a washing cycle, a rinsing and spin-drying cycle, a rinsing and water supply cycle, a rinsing cycle, and a main spin-drying cycle.

In wash water supply (220), wash water supplied from the external water source is mixed with a detergent, and the mixture is supplied into the tub 122. Wash water supply (220) is a step of soaking laundry in the wash water containing the detergent therein in the mixed state and performing preliminary washing before washing (230).

In washing (230), the drum 124 is rotated at various rotational speeds or in various rotational directions.

In washing (230), the laundry in the drum 124 is raised such that the laundry drops due to gravity. Washing (230) is a step of repeatedly raising and dropping the laundry to apply bending force, frictional force, impact force, etc. to the laundry, thereby removing contaminants from the laundry.

At the time of washing (230), tumbling, in which the laundry is raised and then dropped as the result of moving the lifters 124a disposed in the drum 124 in a circumferential direction of the drum 124, may be performed.

According to embodiments, at the time of washing (230), the driving unit 113 may rotate the drum 124 such that the drum 124 can be rotated in a state in which the laundry clings to the drum 124, and the pump 136 may supply wash water to the circulation nozzle 139 such that the wash water can be sprayed into the drum 124 through the circulation nozzle 139.

The driving unit 113 may rotate the drum 124 at 108 revolution per minute (RPM) or higher. In order to prevent overheating of the driving unit 113, the controller 141 may interrupt the operation of the driving unit 113 at intervals of several seconds to several minutes.

At the time of washing (230), the controller 141 may control the bleach valve 132 of the water supply unit 132 to be opened. Wash water supplied as the result of opening of the bleach valve 132 may be mixed with a decolorant in the detergent box 133, and the mixture may be introduced into the tub 122 through the water supply pipe 134. The wash water containing the decolorant therein may be supplied immediately before the completion of washing 230.

Rinsing and spin-drying (240) may be a step of spinning the laundry to remove the wash water from the laundry. In rinsing and spin-drying (240), wash water supplied from the external water source may be sprayed into the drum 124 during acceleration of the drum 124 at a high speed. Rinsing and spin-drying (240) may be a step of perform preliminary rinsing before rinsing (260).

Rinsing and water supply (250) is a step of supplying wash water into the tub 122. At the time of rinsing and water supply (250), the controller 141 intermittently or continuously controls the water supply unit 132 to supply wash water containing a fabric softener therein into the tub 122. At the time of rinsing and water supply (250), the driving unit 113 may rotate the drum 124 such that the laundry can be wet with the wash water containing the fabric softener therein.

Rinsing (260) is a step of rotating the drum 124, in which the laundry is received. At the time of rinsing (260), the controller 141 may control the driving unit 113 to rotate the drum 124 at various rotational speeds or in various rotational directions. At the time of rinsing (260), the laundry is repeatedly raised and dropped such that mechanical force, such as bending force, frictional force, or impact force, is applied to the laundry, thereby removing a residual detergent and contaminants from the laundry.

According to embodiments, at the time of rinsing (260), the driving unit 113 may rotate the drum 124 such that the drum 124 can be rotated in a state in which the laundry clings to the drum 124. At the time of rinsing (260), the controller 141 controls the pump 136 to circulate wash water along the circulation hose 137 and to spray wash water into the drum 124 through the circulation nozzle 139.

Main spin-drying (270) is a step of rotating the drum 124 at a high speed to remove the wash water from the laundry.

At the time of main spin-drying (270), the driving unit may rotate the drum 124 to a rotational speed of 1000 RPM or higher such that a maximum amount of water is separated from the laundry. The maximum rotational speed of the drum 124 at the time of main spin-drying (270) may be higher than the maximum rotational speed of the drum 124 at the time of rinsing and spin-drying (240).

At the time of main spin-drying (270), the controller 141 may control the pump 136 to be operated at intervals of several seconds to several minutes, and the wash water in the tub 122 may be discharged from the washing machine through the drainage hose 138. According to embodiments, the pump may be operated for a predetermined time before main spin-drying (270) in order to discharge the wash water in the tub 122 from the washing machine.

Figure 7:
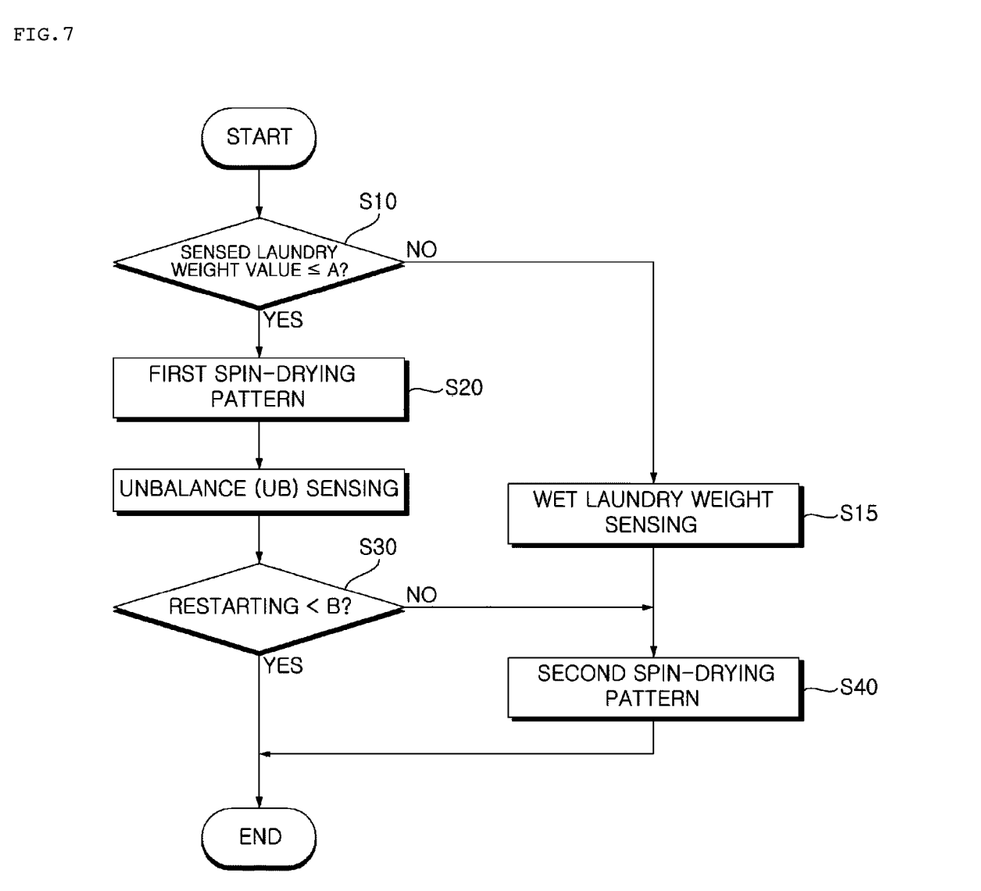
FIG. 7 is a flowchart showing a control method at the time of spin-drying in the method of controlling the washing machine according to the embodiment of the present invention.
Figure 8:
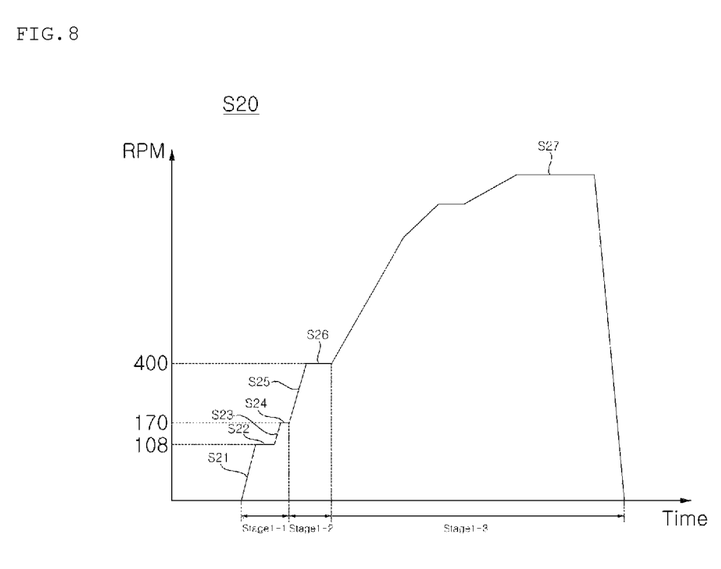
FIG. 8 is a graph showing a first spin-drying pattern in the method of controlling the washing machine according to the embodiment of the present invention.
Figure 9:
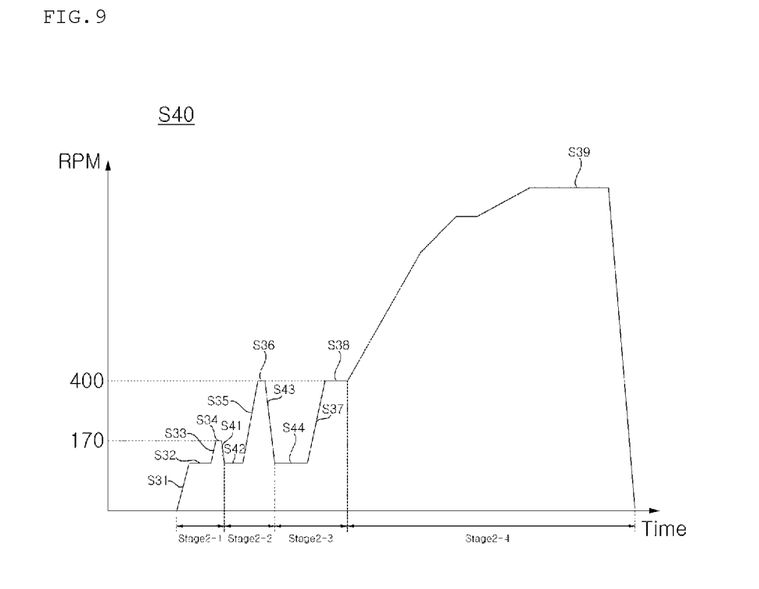
FIG. 9 is a graph showing a second spin-drying pattern in the method of controlling the washing machine according to the embodiment of the present invention.

FIG. 7 is a flowchart showing a control method at the time of spin-drying in the method of controlling the washing machine according to the embodiment of the present invention, FIG. 8 is a graph showing a first spin-drying pattern in the method of controlling the washing machine according to the embodiment of the present invention, and FIG. 9 is a graph showing a second spin-drying pattern in the method of controlling the washing machine according to the embodiment of the present invention.

The spin-drying method of the washing machine according to this embodiment is characterized in that different spin-drying patterns are executed based on the laundry weight. The spin-drying patterns may be selected based on a value of the laundry weight sensed at the time of laundry weight sensing (210) or washing (230).

A value sensed at the previous step may be used as the sensed laundry weight value, or laundry weight sensing may be additionally performed in order to acquire the laundry weight value. Unlike this embodiment, laundry weight sensing may be additionally performed before spin-drying (270).

In a case in which the sensed laundry weight value is equal to or less than A, it is determined that the unbalance of the laundry due to the laundry weight is low, and therefore a first spin-drying pattern is executed. In a case in which the sensed laundry weight value is greater than A, on the other hand, a second spin-drying pattern is executed. The first spin-drying pattern is simpler than the second spin-drying pattern.

In the spin-drying method of the washing machine according to this embodiment, the spin-drying pattern may be selected based on the laundry weight. In a case in which the laundry weight is low, the first spin-drying pattern, which is simpler than the second spin-drying pattern, whereby it is possible to reduce spin-drying time as compared with the second spin-drying pattern.

The spin-drying method of the washing machine according to this embodiment includes a step of comparing the laundry weight value sensed at the previous step with A (S10), a step of, in a case in which the sensed laundry weight value is equal to or less than A, immediately executing a first spin-drying pattern without additional laundry weight sensing (S20), a step of determining the unbalance of laundry based on the number of times of restarting during execution of the first spin-drying pattern (S30), and a step of, in a case in which the number of times of restarting is less than B, continuously executing the first spin-drying pattern and, in a case in which the number of times of restarting is equal to or greater than B, executing a second spin-drying pattern, in which simple spin-drying of the laundry is included (S40).

The spin-drying method of the washing machine according to this embodiment corresponds to main spin-drying (270), which has been previously described.

In a case in which the sensed laundry weight value is greater than A at step S10, a wet laundry weight sensing step (S15) of sensing the weight of wet laundry is performed. After the wet laundry weight sensing step (S15), the drum is driven based on the second spin-drying pattern at step S40.

At step S10, instead of performing additional laundry weight sensing, the laundry weight value sensed at the previous step is compared with A. t step S10, no additional laundry weight sensing is performed.

The laundry weight value sensed at the previous step may be a laundry weight value sensed at the time of laundry weight sensing (210) or washing (230).

The laundry weight value sensed at the time of laundry weight sensing (210) is a value obtained by sensing the weight of dry laundry. In this case, it may be considered that laundry has not been wet in wash water supplied into the washing machine or that wet laundry has been introduced into the washing machine.

The laundry weight value sensed at the time of washing (230) is a value obtained by sensing the weight of wet laundry. Specifically, the laundry weight value sensed at the time of washing (230) is a value obtained by sensing the weight of laundry in a state in which the laundry is wet with wash water supplied at the time of wash water supply (220).

In a spin-drying process performed by a conventional drum type washing machine, a laundry weight value sensed at the time of washing is ignored, and the weight of wet laundry is sensed whenever spin-drying is performed.

In this embodiment, the dry laundry weight value sensed at the time of laundry weight sensing (210) is compared with A. Unlike this embodiment, the wet laundry weight value sensed at the time of washing (230) may be compared with A'. A', which is compared with the sensed wet laundry weight value, is different from A, which is compared with the sensed dry laundry weight value. A is defined as a reference dry laundry weight value, and A' is defined as a reference wet laundry weight value.

Unlike this embodiment, at step S10, the sensed dry laundry weight value may be compared with A, and the sensed wet laundry weight value may be compared with A'. In a case in which both A and A' are used, it is possible to improve reliability and to reduce the number of times of restarting, which will be described hereinafter.

In this embodiment, at the time of main spin-drying (270), a laundry weight sensing process may be omitted, whereby time necessary to perform the laundry weight sensing process may be reduced. In this embodiment, A is 8 lbf. A may be changed based on the size of the drum or the capacity of the driving unit.

The first spin-drying pattern executed at step S20 is a spin-drying pattern in which spin-drying is immediately performed without sensing laundry weight, thereby reducing time.

Referring to FIG. 8, the first spin-drying pattern includes a first acceleration step (S21) of accelerating the drum 124 to 108 RPM, a first maintenance step (S22) of maintaining 108 RPM for a first time after the first acceleration step (S21), a second acceleration step (S23) of accelerating the drum 124 to 170 RPM after the first maintenance step (S22), a second maintenance step (S24) of maintaining 170 RPM for a second time after the second acceleration step (S23), a third acceleration step (S25) of accelerating the drum 124 to 400 RPM after the second maintenance step (S24), a third maintenance step (S26) of maintaining 400 RPM for a third time after the third acceleration step (S25), and a target spin-drying step (S27) of accelerating the drum 124 to a target spin-drying speed (1000 RPM or higher) after the third maintenance step (S26).

In this embodiment, steps S21, S22, S23, and S24 constitute a 1-1 stage, steps S25 and S26 constitute a 1-2 stage, and step S27 constitutes a 1-3 stage.

The speed, 108 RPM, at the first acceleration step (S21) is a first target speed, the speed, 170 RPM, at the second acceleration step (S23) is a second target speed, and the speed, 400 RPM, at the third acceleration step (S25) is a third target speed.

The respective target speeds may be changed based on the design of the washing machine.

At at least one selected from among the first acceleration step (S21), the second acceleration step (S23), and the third acceleration step (S25), a resonance period of the washing machine may be formed.

A deceleration period is excluded from the first spin-drying pattern according to this embodiment.

Since low weight laundry is spin-dried in the first spin-drying pattern, the first acceleration step (S21), the second acceleration step (S23), and the third acceleration step (S25) are sequentially performed, and then the target spin-drying step (S27) is performed, without laundry weight sensing and laundry untangling, thereby greatly reducing spin-drying time.

In addition, since the first spin-drying pattern is applied to wet laundry, the wet laundry is simply spin-dried before step S27 is performed.

In this embodiment, at step S21, the laundry comes into tight contact with the inside surface of the drum 124.

At step S22, the unbalance of the laundry is sensed while the drum 124 is maintained at 108 RPM. In this embodiment, at step S22, the unbalance of the laundry is sensed while the drum 124 is maintained at a constant speed. Unlike this embodiment, the unbalance of the laundry may be sensed in a period in which the drum 124 is accelerated.

In a case in which the unbalance of the laundry is lower than a reference value at step S22, the procedure advances to step S23, at which the drum 124 is further accelerated.

At step S23, the drum 124 is accelerated to 170 RPM.

At step S24, the drum is maintained at 170 RPM for a second time. Step S24 is a simple spin-drying period in which water is squeezed from the wet laundry.

In addition, at step S24, the unbalance of the laundry is also sensed while the drum 124 is maintained at a constant speed of 170 RPM.

In a case in which the unbalance of the laundry is lower than the reference value at step S24, the procedure advances to step S25.

At step S25, the drum 124 is accelerated from 170 RPM to 400 RPM.

At step S26, the wet laundry is simply spin-dried while the drum 124 is maintained at a constant speed of 400 RPM. In addition, at step S26, the unbalance of the laundry is also sensed while the drum 124 is maintained at a constant speed. In a case in which the unbalance of the laundry is lower than the reference value at step S24, the procedure advances to step S27.

The third maintenance step (S26), at which the drum 124 is rotated at 400 RPM, is performed longer than the first and second maintenance step (S22 and S24).

The third maintenance step (S26) is a simple spin-drying period in which water is squeezed from the wet laundry before the target spin-drying step (S27) is performed.

In the third maintenance step (S26), it is possible to reduce the load of the driving unit 113 when the target spin-drying step (S27) is performed and to reduce the unbalance of the laundry when the drum 124 is accelerated to the target spin-drying speed.

In this embodiment, the unbalance of the laundry is sensed at steps S22, S24, and S26. At the respective steps (S22, S24, and S26), different reference values are set as the unbalance of the laundry. The higher the rotational speed of the drum 124 is, the lower the unbalance of the laundry must be in order to minimize vibration and to normally spin-dry the laundry.

In a case in which the unbalance of the laundry sensed at at least one selected from among steps S22, S24, and S26 is greater than the reference value, the driving unit 113 is powered off, and then the first spin-drying pattern is restarted.

At the unbalance determination step (S30), the number of times of restarting performed due to the unbalance of the laundry during execution of the first spin-drying pattern is determined.

The unbalance of the laundry in the drum 124 may be determined using various methods. In this embodiment, the unbalance of the laundry is determined based on number of times of restarting the driving unit 113.

In this embodiment, at steps S22, S24, and S26, the drum 124 is maintained at a constant speed, and a current value of the driving unit 113 is sensed to determine the unbalance of the laundry.

For a drum type washing machine, the driving unit 113 provides driving force to the drum 124.

During the rotation of the drum 124, a difference is generated between a rotational angular speed of the drum 124 when the laundry moves from the lower side of the drum 124 to the upper side of the drum 124 (hereinafter, referred to as an upward angular speed) and a rotational angular speed of the drum 124 when the laundry moves from the upper side of the drum 124 to the lower side of the drum 124 (hereinafter, referred to as a downward angular speed).

For example, when the drum 124 is rotated at 108 RPM at step S21, the laundry comes into tight contact with the inside surface of the drum 124. In a state in which the laundry is in tight contact with the inside surface of the drum 124, the drum 124 is maintained at a constant speed of 108 RPM for a first time at step S22. When the drum 124 is maintained at the constant speed, the driving unit 113 has different current values due to the difference between the rising load of the laundry and the dropping load of the laundry.

In this embodiment, the change in current value of the driving unit 113 in the constant speed period is determined in order to determine the unbalance of the laundry.

In a case in which the change in current value of the driving unit 113 in the constant speed period is greater than a reference value, it is determined that the unbalance of the laundry is high. Consequently, the driving unit 113 is powered off such that the operation of the driving unit 113 is stopped.

Subsequently, the driving unit 113 is powered on again to restart the first spin-drying pattern.

In this embodiment, the number of times of power off or the number of times of restarting B may be set to 2 to 10. The number of times of power off B may be variously set based on the kind or size of the washing machine, the presence or absence of balancers, etc.

In this embodiment, the unbalance of the laundry in the drum 124 is detected using a circuit of the driving unit 113. Unlike this embodiment, however, the unbalance of the laundry in the drum 124 may be detected or determined using various other methods.

For example, in a case in which the unbalance of the laundry is greater than the reference value, time necessary to reach a target speed to be controlled may be increased. Time necessary for the drum 124 to reach the target speed may be detected to determine the unbalance of the laundry.

In addition, at the unbalance determination step (S30), the drum 124 is accelerated until the speed of the drum 124 reaches a unbalance sensing RPM (for example, 108 RPM), and the drum 124 is controlled to be rotated at a constant speed for a unbalance sensing time when the speed of the drum 124 reaches the RPM for unbalance sensing (for example, 108 RPM).

In a case in which an RPM ripple is greater than a predetermined value when the drum 124 is controlled to be rotated at the constant speed, it may be determined that the unbalance UB of the laundry is high.

The unbalance UB of the laundry may be determined using various methods.

In this embodiment, in a case in which the number of times of restarting is greater than 5, execution of the first spin-drying pattern is stopped, and the procedure advances to step S40, at which a second spin-drying pattern is executed.

The second spin-drying pattern includes a first acceleration step (S31) of accelerating the drum 124 to a first target speed (108 RPM), a first maintenance step (S32) of maintaining the first target speed (108 RPM) for a first time after the first acceleration step (S31), a second acceleration step (S33) of accelerating the drum 124 to a second target speed (170 RPM) after the first maintenance step (S32), a second maintenance step (S34) of maintaining the second target speed (170 RPM) for a second time after the second acceleration step (S33), a first deceleration step (S41) of decelerating the drum 124 to the first target speed (108 RPM) after the second maintenance step (S34), a fourth maintenance step (S42) of maintaining the first target speed (108 RPM) for a fourth time after the first deceleration step (S41), a third acceleration step (S35) of accelerating the drum 124 to a third target speed (400 RPM) after the fourth maintenance step (S42), a third maintenance step (S36) of maintaining the third target speed (400 RPM) for a third time after the third acceleration step (S35), a second deceleration step (S43) of decelerating the drum 124 to the first target speed (108 RPM) after the third maintenance step (S36), a fifth maintenance step (S44) of maintaining the first target speed (108 RPM) for a fifth time after the second deceleration step (S43), a fourth acceleration step (S37) of accelerating the drum 124 to the third target speed (400 RPM) after the fifth maintenance step (S44), a sixth maintenance step (S38) of maintaining the third target speed (400 RPM) for a sixth time after the fourth acceleration step (S37), and a target spin-drying step (S39) of accelerating the drum 124 to a target spin-drying speed (1000 RPM) after the sixth maintenance step (S38).

In this embodiment, steps S31, S32, S33, S34, and S41 constitute a 2-1 stage, steps S42, S35, S36, and S43 constitute a 2-2 stage, steps S44, S37, and S38 constitute a 2-3 stage, and step S39 constitutes a 2-4 stage.

In this embodiment, the second spin-drying pattern may be executed after step S30 or S15.

In the second spin-drying pattern, the unbalance of the laundry may be sensed in the constant speed periods (S32, S34, S42, S36, S44, and S38), in the same manner as in the first spin-drying pattern.

At steps S34, S36, and S38, simple spin-drying is performed. That is, water is squeezed from the wet laundry while the drum 124 is rotated at the constant speed.

In particular, at steps S42 and S44, it may be determined how much the unbalance of the laundry has been reduced after simple spin-drying. The unbalance of the laundry sensed at step S42 may be lower than the unbalance of the laundry sensed at step S34. In a case in which the unbalance of the laundry sensed at step S42 is lower than the unbalance of the laundry sensed at step S34, it may be determined that spin-drying is being normally performed.

In the same manner, the unbalance of the laundry sensed at step S44 may be lower than the unbalance of the laundry sensed at step S36. In this case, it may be determined that spin-drying is being normally performed.

On the other hand, in a case in which the unbalance of the laundry sensed at step S42 is higher than the unbalance of the laundry sensed at step S34 or the unbalance of the laundry exceeds the reference value, the driving unit 113 may be powered off. In addition, in a case in which the unbalance of the laundry sensed at step S44 is higher than the unbalance of the laundry sensed at step S36 or the unbalance of the laundry exceeds the reference value, the driving unit 113 may be powered off.

Only in a case in which spin-drying is performed normally while the unbalance of the laundry is reduced, the procedure advances to the target spin-drying step (S39).

In this embodiment, the spin-drying method of the drum type washing machine has been described by way of example. Unlike this embodiment, however, the present invention may also be applied to a top loading type washing machine.

As is apparent from the above description, the present invention has one or more of the following effects.

First, in a case in which the laundry weight is low, spin-drying is immediately performed without performing laundry weight sensing, whereby it is possible to reduce time necessary to sense the laundry weight.

Second, in a case in which the unbalance of the laundry is high during spin-drying although the laundry weight is low, spin-drying for high capacity is performed, whereby it is possible to smoothly perform spin-drying.

Third, at least one selected from between the laundry weight and the unbalance of the laundry is determined to actively select an appropriate one of the spin-drying patterns, whereby it is possible to minimize spin-drying time.

It should be noted that effects of the present invention are not limited to the effects of the present invention as mentioned above, and other unmentioned effects of the present invention will be clearly understood by those skilled in the art from the following claims.

Although the preferred embodiments of the present invention have been disclosed for illustrative purposes, those skilled in the art will appreciate that various modifications, additions and substitutions are possible, without departing from the scope and spirit of the invention as disclosed in the accompanying claims. It should be noted that such modifications, additions and substitutions cannot be individually understood from technical concept or prospects of the present invention.

What is claimed is:

1. A method of controlling a washing machine, comprising:
   first sensing a laundry weight of laundry present in the washing machine;
   comparing a first sensed laundry weight value with a value 'A';
   executing a first spin-drying pattern when the first sensed laundry weight value is equal to or less than A; and
   executing a second spin-drying pattern after second sensing the laundry weight of laundry present in the washing machine when the first sensed laundry weight value is greater than A.

2. The method of claim 1, wherein the first spin-drying pattern comprises accelerating a drum in a stopped state to spin-dry the laundry.

3. The method of claim 1, wherein the first spin-drying pattern comprises:
   a 1-1 stage for accelerating a drum in a stopped state and sensing an unbalance of the laundry in the drum;
   a 1-2 stage for further accelerating the drum after the 1-1 stage and sensing again the unbalance of the laundry in the drum; and
   a 1-3 stage for further accelerating the drum after the 1-2 stage to spin-dry the laundry.

4. The method of claim 3, wherein the 1-1 stage comprises:
   first accelerating the drum to a first target speed;
   first maintaining the first target speed for a first time after the first accelerating step;
   second accelerating the drum to a second target speed after the first maintaining step; and
   second maintaining the second target speed for a second time after the second accelerating step.

5. The method of claim 4, wherein the unbalance of the laundry in the drum is sensed in at least one of the first maintaining step and the second maintaining step.

6. The method of claim 5, wherein, when the unbalance of the laundry in the drum sensed in the at least one of the first maintaining step and the second maintaining step is greater than a reference value, the drum is stopped, and the first spin-drying pattern is restarted.

7. The method of claim 6, wherein, when a number of restarting times is equal to or greater than a value 'B', switching from the first spin-drying pattern to the second spin-drying pattern.

8. The method of claim 3, wherein the 1-2 stage comprises:
third accelerating the drum to a third target speed after the 1-1 stage; and
third maintaining the third target speed for a third time after the third accelerating step.

9. The method of claim 8, wherein the unbalance of the laundry in the drum is sensed in the third maintaining step, and, when the sensed unbalance of the laundry in the drum is greater than a reference value, the drum is stopped, and the first spin-drying pattern is restarted.

10. The method of claim 9, wherein, when a number of restarting times is equal to or greater than a value 'B', switching from the first spin-drying pattern to the second spin-drying pattern.

11. The method of claim 1, wherein the first sensing laundry weight step comprises acquiring at least one of a laundry weight value for dry laundry and a laundry weight value for wet laundry.

12. The method of claim 1, wherein the first spin-drying pattern comprises:
first accelerating a drum to a first target speed;
first maintaining the first target speed for a first time after the first accelerating step;
second accelerating the drum to a second target speed after the first maintaining step;
second maintaining the second target speed for a second time after the second accelerating step;
third accelerating the drum to a third target speed after the second maintaining step;
third maintaining the third target speed for a third time after the third accelerating step; and
fourth accelerating the drum to a target spin-drying speed after the third maintaining step.

13. The method of claim 12, wherein the first spin-drying pattern comprises accelerating the drum in a stopped state to spin-dry the laundry.

14. The method of claim 12, wherein an unbalance of the laundry in the drum is sensed in at least one of the first maintaining step, the second maintaining step, and the third maintaining step, and, when the sensed unbalance of the laundry in the drum is greater than a reference value, the drum is stopped, and the first spin-drying pattern is restarted.

15. The method of claim 14, wherein, when a number of restarting times is equal to or greater than a value 'B', switching from the first spin-drying pattern to the second spin-drying pattern.

* * * * *